United States Patent
Wajs

(10) Patent No.: US 9,979,989 B2
(45) Date of Patent: *May 22, 2018

(54) CONSTRUCTING A TRANSPORT STREAM

(71) Applicant: Irdeto B.V., Hoofddorp (NL)

(72) Inventor: Andrew Augustine Wajs, Hoofddorp (NL)

(73) Assignee: IRDETO B.V., LS Hoofddorp (NL)

( * ) Notice: Subject to any disclaimer, the term of this patent is extended or adjusted under 35 U.S.C. 154(b) by 38 days.

This patent is subject to a terminal disclaimer.

(21) Appl. No.: 15/090,266

(22) Filed: Apr. 4, 2016

(65) Prior Publication Data

US 2017/0026673 A1    Jan. 26, 2017

Related U.S. Application Data

(63) Continuation of application No. 14/354,484, filed as application No. PCT/EP2011/069051 on Oct. 28, 2011, now Pat. No. 9,332,286.

(51) Int. Cl.
*H04N 21/2389* (2011.01)
*H04N 21/236* (2011.01)
(Continued)

(52) U.S. Cl.
CPC ..... *H04N 21/23892* (2013.01); *H04N 21/236* (2013.01); *H04N 21/2347* (2013.01); *H04N 21/2362* (2013.01); *H04N 21/2365* (2013.01); *H04N 21/23439* (2013.01); *H04N 21/23476* (2013.01); *H04N 21/23605* (2013.01);
(Continued)

(58) Field of Classification Search
CPC ......... H04N 21/23892; H04N 21/4181; H04N 21/835; H04N 21/4623; H04N 21/4627; H04N 21/44055; H04N 21/4405; H04N 21/23439; H04N 21/4347; H04N 21/2365; H04N 21/2362; H04N 21/23608; H04N 21/23605; H04N 21/23476
See application file for complete search history.

(56) References Cited

U.S. PATENT DOCUMENTS 5,838,678 A    11/1998 Davis et al.
7,058,809 B2 *  6/2006 White ................ H04N 1/32272
                                                    348/E7.056
(Continued)

FOREIGN PATENT DOCUMENTS

EP    1 111 923 A1    6/2001
EP    1 134 977 A1    9/2001
(Continued)

OTHER PUBLICATIONS

Communication pursuant to Article 94(3) EPC dated Sep. 18, 2017 in corresponding European Patent Application No. 11776196.5, 5 pages.
(Continued)

*Primary Examiner* — Benjamin R Bruckart
*Assistant Examiner* — Tien M Nguyen
(74) *Attorney, Agent, or Firm* — Rimon, P.C.; Marc Kaufman

(57) ABSTRACT

There is disclosed a head-end system in which differently processed copies of content portions are reordered such that copies from different content portions are not interleaved in the final transport stream.

34 Claims, 11 Drawing Sheets

(51) Int. Cl.
*H04N 21/8358* (2011.01)
*H04N 21/2343* (2011.01)
*H04N 21/2347* (2011.01)
*H04N 21/2362* (2011.01)
*H04N 21/2365* (2011.01)
*H04N 21/418* (2011.01)
*H04N 21/434* (2011.01)
*H04N 21/4405* (2011.01)
*H04N 21/4623* (2011.01)
*H04N 21/835* (2011.01)
*H04N 21/438* (2011.01)

(52) U.S. Cl.
CPC . *H04N 21/23608* (2013.01); *H04N 21/23895* (2013.01); *H04N 21/4181* (2013.01); *H04N 21/4347* (2013.01); *H04N 21/4405* (2013.01); *H04N 21/44055* (2013.01); *H04N 21/4623* (2013.01); *H04N 21/835* (2013.01); *H04N 21/8358* (2013.01); *H04N 21/4383* (2013.01)

(56) References Cited

U.S. PATENT DOCUMENTS

| | | | |
|---|---|---|---|
| 7,415,440 B1 | 8/2008 | Fransdonk | |
| 9,332,286 B2 | 5/2016 | Wajs | |
| 2002/0067745 A1* | 6/2002 | Coupe | H04N 21/426 370/535 |
| 2002/0150239 A1* | 10/2002 | Carny | H04N 21/23476 380/37 |
| 2003/0021412 A1* | 1/2003 | Candelore | H04N 7/162 380/217 |
| 2005/0169473 A1 | 8/2005 | Candelore | |
| 2008/0137850 A1 | 6/2008 | Mamidwar | |
| 2011/0211695 A1* | 9/2011 | Westerveld | G06T 1/0021 380/212 |

FOREIGN PATENT DOCUMENTS

| | | |
|---|---|---|
| EP | 2 146 506 A1 | 1/2010 |
| EP | 2 334 070 A1 | 6/2011 |
| EP | 2 341 708 A1 | 7/2011 |
| EP | 2 772 060 A1 | 9/2014 |
| WO | 01/67667 A1 | 9/2001 |
| WO | 2013/060390 | 5/2013 |

OTHER PUBLICATIONS

International Search Report and Written Opinion issued in corresponding International Application No. PCT/EP2011/069051 dated Jul. 25, 2012, 10 pages.

Stenborg, "Distribution and individual watermarking of streamed content for copy protection", Dec. 31, 2005, pp. 1-100, XP002576297, URL:http://liu/diva-portal.org/smash/geUdiva2:20656/FULLT EXT01.

International Preliminary Report on Patentability issued in corresponding International Application No. PCT/EP2011/069051 dated May 8, 2014, 7 pages.

Non-Final Office Action received in corresponding U.S. Appl. No. 14/354,484, dated May 22, 2015, 25 pages.

Notice of Allowance received in corresponding U.S. Appl. No. 14/354,484, dated Jan. 6, 2016, 21 pages.

* cited by examiner

1. Identify content portions (CP) in the original elementary stream (OES)

2. Select a content portion and create copies in separate elementary streams

3. Process the copies in the separate elementary stream differently

4. Packetise and protect the elementary streams

5. Multiplex the packets into a single datastream

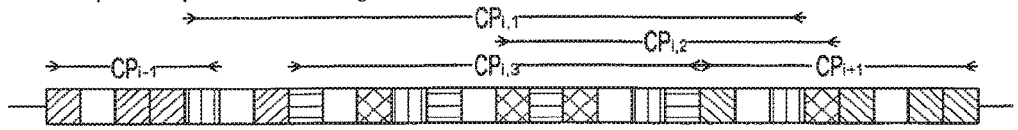

6. De-multiplex the separate elementary stream and the associated original elementary stream

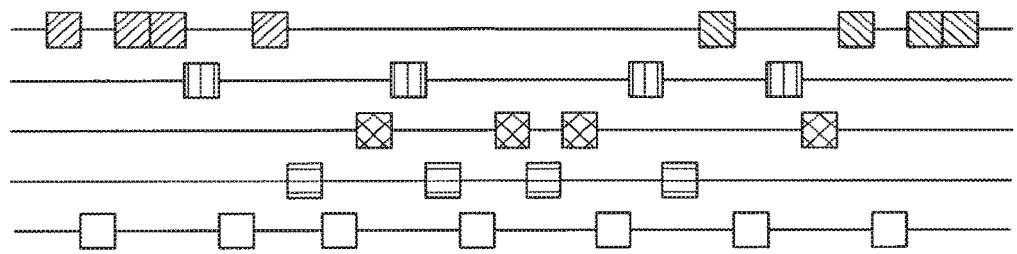

7. Re-order the packets to remove interleaving of packets from different CP's

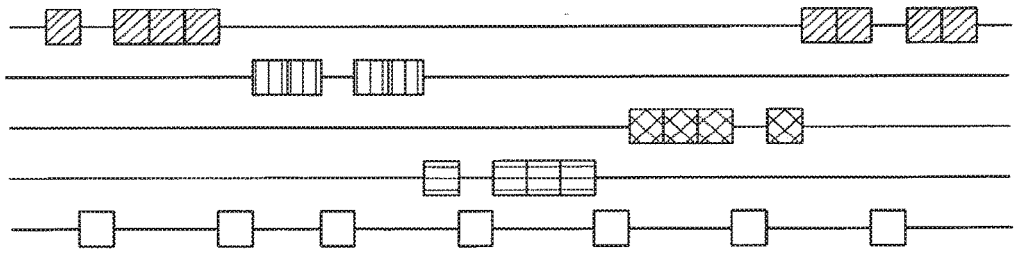

8. Remap the PID's of the packets to create a (single) merged elementary stream

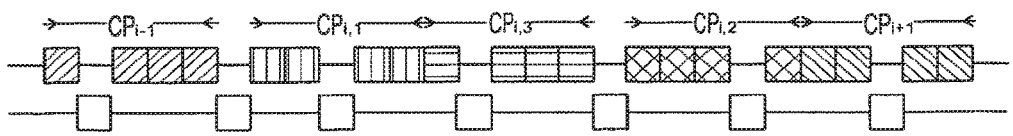

9. Multiplex the packets and adapt the metadata to create a single re-ordered data stream

Fig. 8b

CONSTRUCTING A TRANSPORT STREAM

RELATED APPLICATION DATA

This application is a continuation of U.S. application Ser. No. 14/354,484, filed Apr. 25, 2014, which is the National Stage of International Patent Application No. PCT/EP2011/069051, filed Oct. 28, 2011, the disclosures of which are hereby incorporated herein by reference in their entirety

FIELD OF THE INVENTION

The present invention relates to a method of preparing digital content for transmission to a plurality of receivers, a head-end system implementing the method, and a system comprising such a head-end and one or more said receivers. In particular, but not exclusively, the invention may be implemented in a DVB digital television system, where the receivers are set top boxes, television sets or similar, and may be used for example in the implementation of a digital watermarking or fingerprinting scheme.

BACKGROUND OF THE INVENTION

In television broadcast systems compliant with DVB standards, related video, audio and data content, such as video audio and program guide data for a single TV channel or group of TV channels, is processed by a broadcaster head-end system for delivery to receivers in an MPEG-2 data stream called a transport stream (TS). A transport stream comprises one or more content streams referred to as packetized elementary streams, each packetized elementary stream (PES) typically containing the data for one video, audio or data content aspect of one of the television channels. Each packet of a PES is typically spread across many smaller transport stream packets for broadcast, with the transport stream packets for the multiple PESs being multiplexed into a single transport stream for transmission.

Provisioning of protected DVB services is typically enabled using a conditional access (CA) system. Content data is encrypted in a broadcaster head-end system and delivered to receivers in TS packets along with metadata enabling each receiver to use the correct key, commonly referred to as a control word, to decrypt the content. Control word provisioning may be achieved using a smartcard, or other conditional access/digital rights management (CA/DRM) client at the receiver. Control words are usually sent to the receivers in encrypted form within entitlement control messages (ECMs) delivered in the TS using MPEG-2 sections alongside the PESs carrying video, audio and/or other data. The CA/DRM client decrypts data in the ECMs to retrieve the control words, using product keys which are updated periodically using entitlement management messages (EMMs), and delivers the control words as required to one or more decrypters in the receiver.

Digital watermarking of content is well known. The content may comprise any type of information, and may include one or more of audio data, image data, video data, textual data, multimedia data, a web page, software products, security keys, experimental data or any other kind of data. There are many methods for performing digital watermarking of content but, in general, they all involve adding a watermark to an item of content. This involves embedding, or adding, watermark symbols (or a watermark codeword or payload data) into the original item of content to form a watermarked item of content. The watermarked item of content can then be distributed to one or more receivers (or users or recipients or receivers).

One particular application of digital watermarking is in the delivery of video signals in a digital video broadcasting (DVB) system, although many others exist.

WO01/67667 describes a technique in which content can be delivered in a encrypted form to a plurality of receivers in such a manner that the content stream recovered at each receiver or subset of receivers carries a different set of watermark symbols, or fingerprint, from that recovered at other receivers or subsets of receivers. This is achieved by including in a content stream multiple (typically two) copies of some or all portions of the content, each copy carrying a different watermark symbol and being encrypted using a different control word than the other copies of the same content portion. By controlling the control words available at each receiver, the set of watermark symbols, or fingerprint, present in a content stream reconstructed at each receiver is controlled.

EP2341708 describes a similar scheme in which error handling capabilities of the receivers are used to reject content portions which are decrypted with the wrong control word, so that only the intended watermark symbols are found in the reconstructed stream at a particular receiver.

EP2334070 describes ways in which the broadcaster head-end may be arranged to generate a suitable encrypted content stream for delivery to receivers in order to implement a similar fingerprinting scheme.

It would be desirable to be able to implement a scheme for delivering content multiple, differently processed copies of at least selected portions of content in a single transport stream to a plurality of receivers by adding extra functional modules to a conventional head-end system and avoiding or minimising reengineering of existing functional modules, so that such a scheme can be more easily integrated into an existing or already designed broadcaster head-end system. The invention seeks to address this and other problems of the related prior art.

SUMMARY OF THE INVENTION

The invention provides apparatus and methods for providing media content at a plurality of receivers or receiver groups using the same content stream such that at each receiver, or each group of receivers, the media content is reconstructed to carry a differently processed copy of at least some part or parts of the content. For example, the media content may be reconstructed to carry a different sequence of watermark symbols, that is a different fingerprint, at each receiver or receiver group. This is preferably achieved by including multiple copies of at least some portions of the content in the content stream, each one of multiple copies being differently processed at the head-end, for example carrying an alternative watermark symbol and being differently encrypted, and selectively restricting whether particular content portions can be decrypted at particular receivers or groups of receivers. In particular, the invention provides ways of achieving this in legacy systems which already provide content protection functionality, for example by adding functional modules to a head-end system in a way which avoids significant reengineering of aspects of existing conditional access functional modules.

To this end, the invention provides a head-end system for preparing digital content for transmission to a plurality of receivers, the digital content comprising a sequence of content portions, the system comprising: a pre-processor arranged to generate at least first and second copies of each content portion; a content protection and content packaging system arranged to distribute or output each of the at least first and second copies of each content portion into a separate group of transport stream packets, each of the at least first and second copies of each content portion distributed into transport stream packets being differently encrypted to the other or others of the copies of that content portion, and to merge all of the said transport stream packets for each content portion into an original transport stream in which at least some of the transport stream packets deriving from the same content portion but differently encrypted are interleaved; and a post-processor arranged to reorder the original transport stream to form a re-multiplexed transport stream in which transport stream packets containing parts of the same content portion but being differently encrypted are not interleaved.

In some embodiments all of the transport stream packets are formed in the content protection and packaging system. In other embodiments, some of the transport stream packets may be formed prior to processing by the content protection and packaging system, for example in the pre-processor, for example by an additional conditional access system arranged to process one or more of the copies of content portions.

The addition of a post-processor with such functionality enables receivers to be used which do not need to select transport stream packets which derive from the same elementary content stream before attempting decryption, which may be problematic in legacy receivers.

The sequence of content portions selected for copying as set out above may include all available portions of the content, or a subset of such portions which may typically be interspersed between other non selected portions. The selected portions may, for example, be only a small proportion such as 10% of all available portions of the content.

Usual behaviour of a legacy head-end conditional access subsystem would be to treat each different copy of a content portion as belonging to a different elementary stream and therefore would be to mark transport stream packets containing each of the different copies of a content portion with a different corresponding stream label visible in the transport stream packets to the post-processor. So that receivers can reconstruct a single elementary stream from the copies of the content portion and the original elementary stream packets, the post-processor may comprise a stream label filter arranged to detect and filter received transport stream packets according to stream label applied by the content protection and content packaging system. The post-processor may replace the different corresponding stream labels with a single stream label for the transport packets containing any of the differently encrypted copies of a content portion and the original elementary stream packets in the re-multiplexed transport stream.

The head-end system may be arranged to include in the re-multiplexed transport stream data enabling handling of control words at said receivers such that a plurality of receivers each reconstructs the sequence of content portions to contain a different sequence of said watermark symbols, or an otherwise different version of the content, such data including for example entitlement control messages comprising said control words and entitlement management messages restricting access by particular receivers to particular subsets of said control words.

The head-end may be further adapted to include in the re-multiplexed transport stream: a stream comprising said differently encrypted parts of a said content portion; a first entitlement control message containing key data for decrypting a first said copy of the content portion; a second entitlement control message containing key data for decrypting a second said copy of the content portion; first mapping data comprising a content stream label identifying said stream of differently encrypted parts of a said content portion, a first content data type corresponding to a data type of said content portion, and a first conditional access stream label identifying said first entitlement control message; and second mapping data comprising said content stream label identifying said stream of differently encrypted parts of said content portion, a second data type not corresponding to a data type of said content portion, and a second conditional access stream label identifying said second entitlement control message. Preferably then, the transport stream contains essentially no content portions of the second content data type identified by said second mapping data, although it may be necessary to include a small amount of data, for example containing empty payload data, to ensure that some receivers process the content portions, entitlement control messages, and mapping data as required. For example, the amount of content data of the second content data type in the transport stream may be less than 1% of the amount of content data of the first content data type in the transport stream.

The invention also provides a digital television system comprising the head-end system as set out herein, and a plurality of receivers coupled to the head-end system by a transmission medium (20).

The invention also provides methods corresponding to the above apparatus, including a method of preparing digital content for transmission to a plurality of receivers, and a method of adapting a head-end system for preparing digital content.

The invention also provides computer readable media carrying computer program code operable to put into effect the methods described herein when executed on suitable computer apparatus, for example computer apparatus being used to implement, in part or in whole, a head-end system as set out herein.

BRIEF DESCRIPTION OF THE DRAWINGS

Embodiments of the invention will now be described, by way of example only, with reference to the accompanying drawings, in which:

FIGS. 8a and 8b illustrate the described method of copying portions of content, processing the copies differently, and re-multiplexing resulting packets to form a reordered and merged elementary stream.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will also be evident that various modifications and changes may be made to the embodiments described herein without departing from the broader spirit and scope of the invention as set forth in the appended claims.

Figure 1:
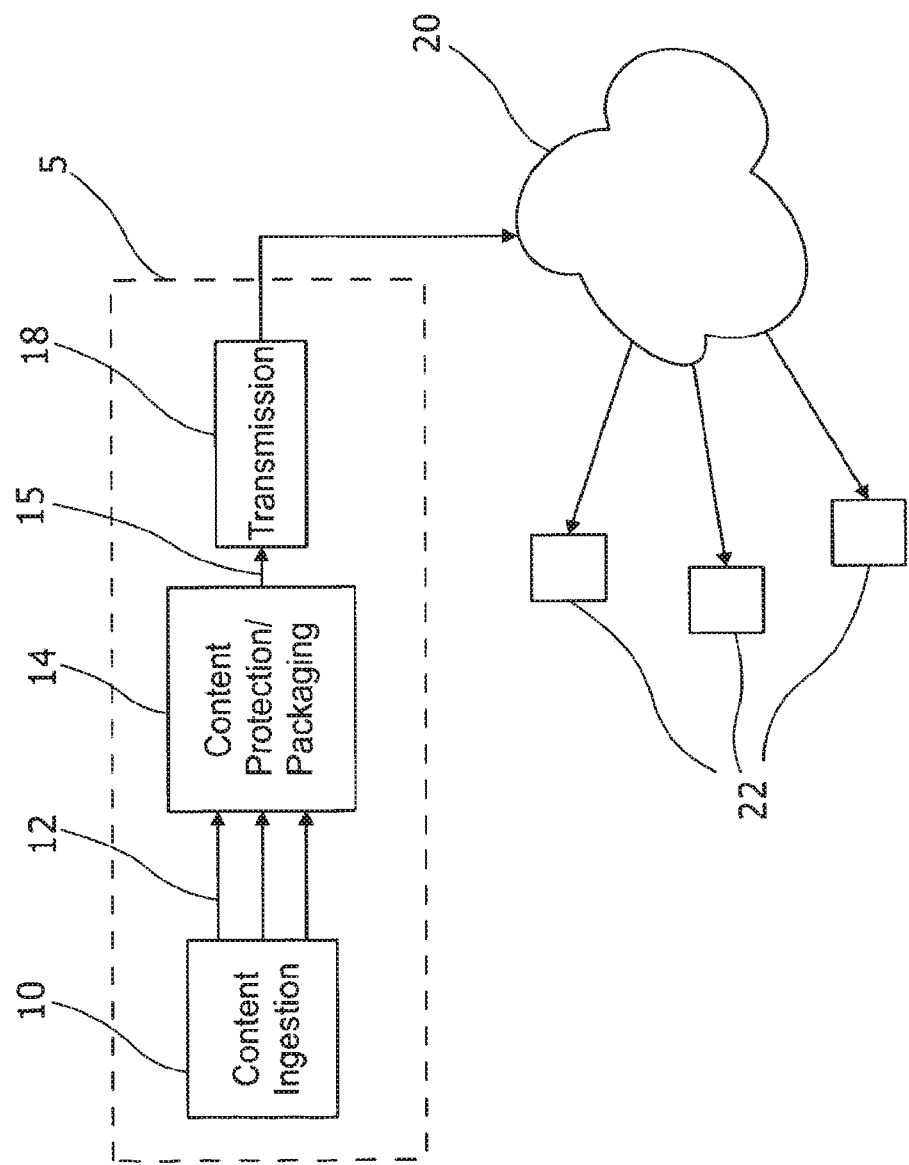
FIG. 1 shows a prior art digital television system comprising a head-end delivering content over a distribution medium to a plurality of receivers.

Referring to FIG. 1 there is shown a head-end system 5 for broadcasting content, such as a DVB head-end system, as found in the prior art. The head-end system includes a content ingestion function 10 which receives content, such as television video, audio and related data content, and prepares and schedules the content for transmission to a plurality of receivers 22. The content ingestion function 10 forwards the content as elementary streams 12 to a content protection and content packaging system 14 which carries out encryption and packetisation functions, before forwarding the content as a packetised stream 15 to a transmission function 18 which is arranged to broadcast or otherwise transmit the packetised stream over a network, broadcast radio interface or other medium 20 to the receivers 22. In such an arrangement, the elementary streams 12 may be, for example, MPEG packetized elementary streams (PESs), and the three elementary streams shown in the figure could be a video stream, an audio stream, and an electronic program guide or other data stream. These elementary streams may be made up of PES packets, or other content portions. Similarly, the transmission stream 15 may be, for example, an MPEG transport stream, in which each TS packet carries a packet ID (PID) value which associates the payload of the TS packet with a particular one of the elementary streams 12.

In the arrangement of FIG. 1, the content protection and content packaging system 14 performs tasks of providing a control word, encrypting a content portion using the control word, and distributing the encrypted content portion across a number of transport stream packets each carrying a label such as a PID linking the transport stream packets to the original elementary streams. The content protection and content packaging system 14 also embeds into the transport stream data which can be used by receivers to derive the correct control word to decrypt the content portion, for example as entitlement control messages (ECMs).

Figure 2:
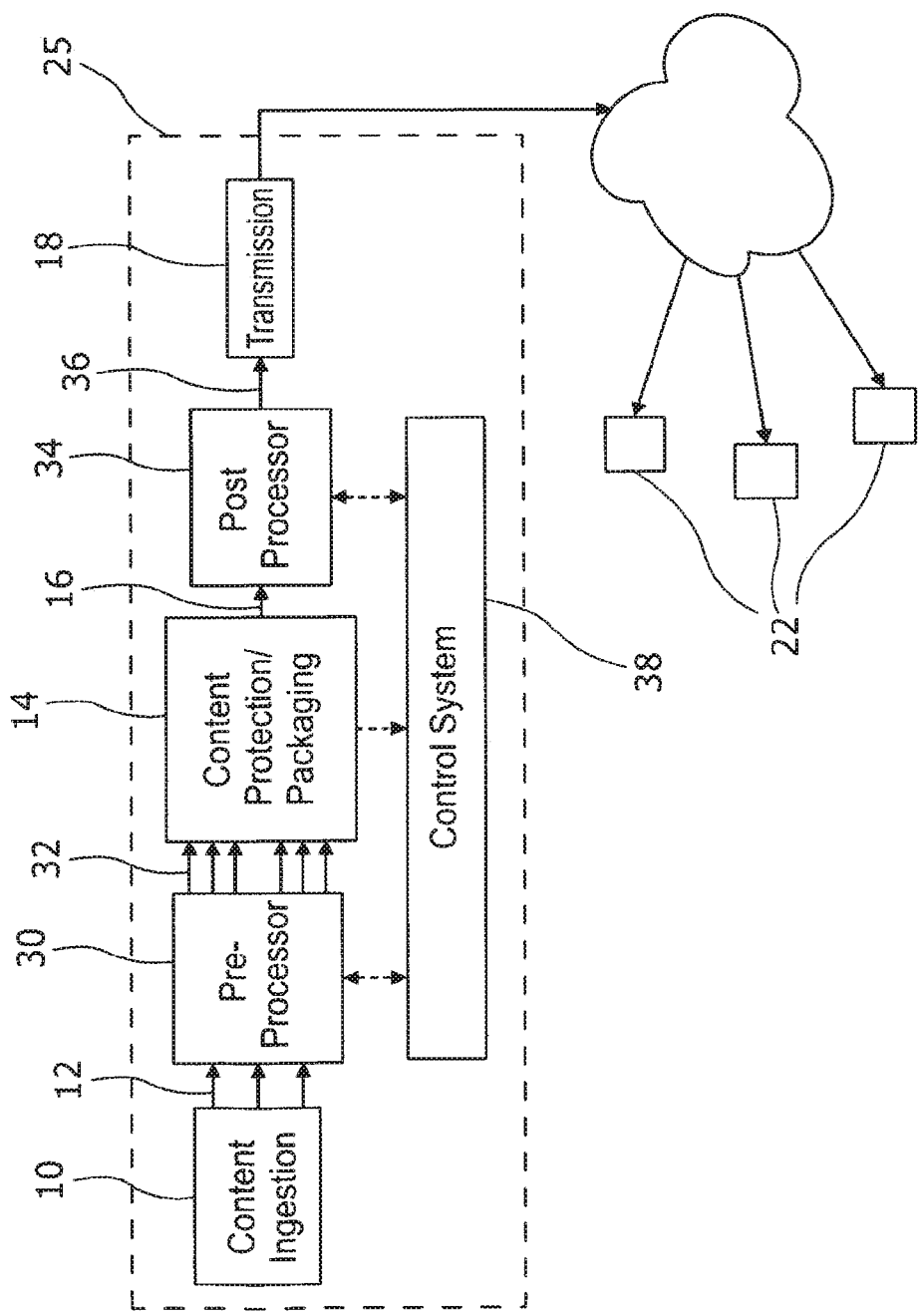
FIG. 2 illustrates the prior art system of FIG. 1 where the head-end has been adapted according to the invention to provide digital fingerprinting or other functionality in the content delivered to the receivers.

FIG. 2 shows how the head-end system of FIG. 1 may be adapted to create a head-end system 25 which implements a fingerprinting scheme. The content ingestion function 10, content protection and content packaging system 14 and transmission function 18 remain essentially unchanged. Newly added are a pre-processing function 30 which in this case receives the original elementary streams 12 from the content ingestion system 10 and forwards watermarked elementary streams 32 to the content protection and content packaging system 14, and a post processing function 34 which receives an original transport stream 16 from the content protection and content packaging system 14 and forwards a modified transport stream 36 to the transmission function 18 for broadcast to the receivers 22. Also added is a control system 38 which controls the pre-processor function 30 and the post processing function 34, also receiving necessary data from the content protection and content packaging system 14 as will be described below. Because the new pre-processing function 30 and post processing function 34 are external to the content protection and content packaging system, these new components can easily be added to legacy head-end systems. Note that the number of watermarked elementary streams 32 is shown as twice the number of original elementary streams 12, because typically each elementary stream 12 is duplicated into two differently watermarked copies, but other numbers of watermarked copies may be used as described elsewhere in this document.

Figure 3:
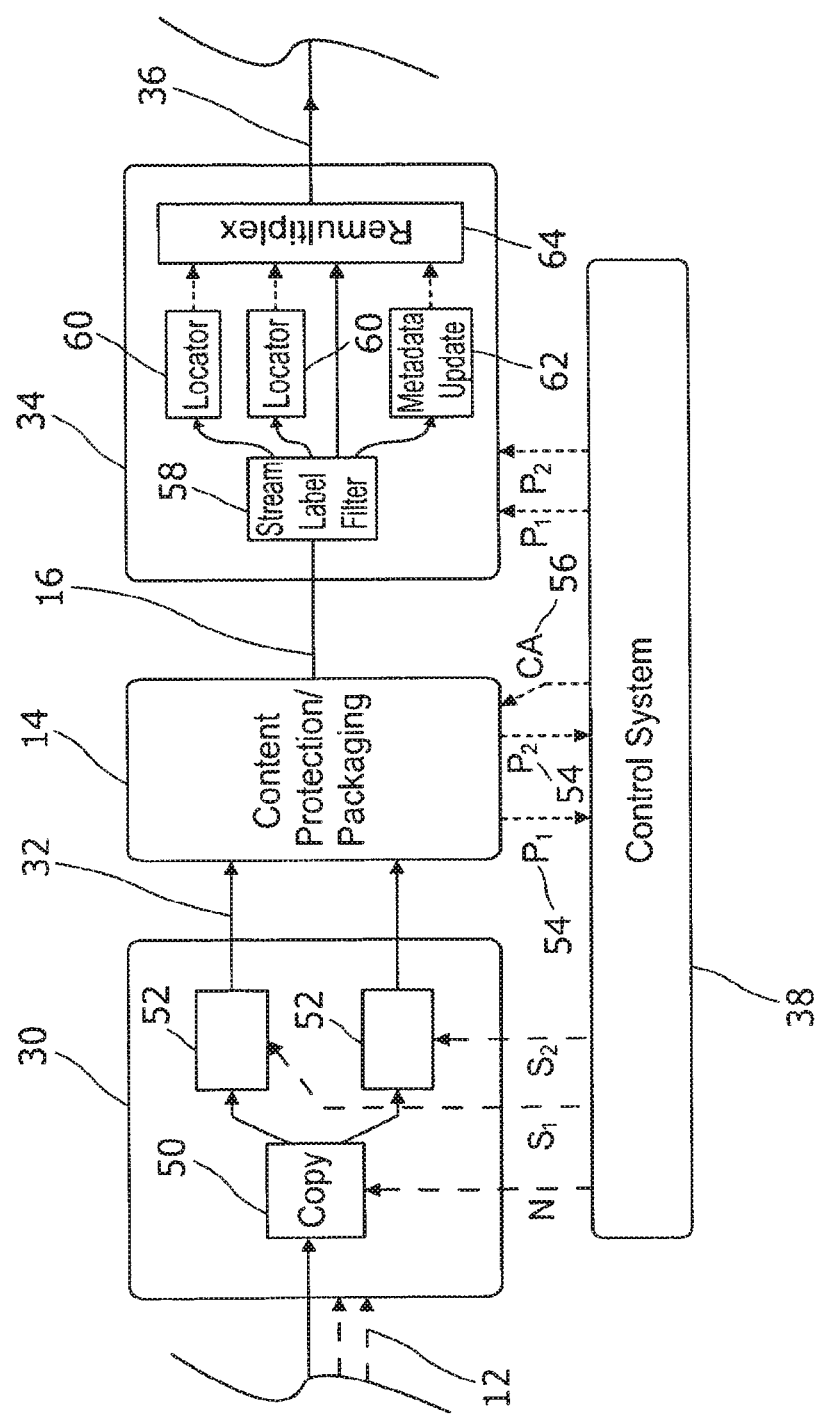
FIG. 3 shows more detail of functional modules of the head-end of FIG. 2.

FIG. 3 shows in more detail how the pre-processing function 30 and the post processing function 34 may be implemented. The pre-processing function 30 receives content portions in an original elementary stream 12 from the content ingestion function 10. Although the processing of only one original elementary stream 12 by the pre-processing function 30 is shown in the figure, others of the original elementary streams may be similarly processed if required. A copy component 50 forms multiple copies of each content portion, with the number of copies denoted as N in the figure, and passes one copy to each of multiple pre-processors 52 which watermark each copy with a different symbol, denoted $S_1$ and $S_2$ in the figure. Although the figure indicates two copies of each content portion being made, thus N=2, in practice more than two copies may be used, for example under the control of the control system 38. Similarly, although every content portion of the stream 12 may be copied and watermarked, the invention can also be implemented by copying and watermarking only a subset of the content portions, by making different numbers of copies of different content portions, by watermarking only one of the copies and leaving the other copy un-watermarked, and using various combinations of such variations, subject to the content portions being copied and watermarked to a sufficient extent that different fingerprints can be formed in the decrypted content streams at different receivers by successful decryption of only one of two or more copies of at least some of the content portions. Although a copy function is shown, it will be appreciated that the watermarked elementary streams 32 may be constructed without the intermediate step of making direct copies of the content portions of the original elementary stream 12.

The watermarking may be carried out in a variety of different ways familiar to the person skilled in the art, and the techniques used may vary between, for example, elementary streams carrying video and audio content.

Figure 4:
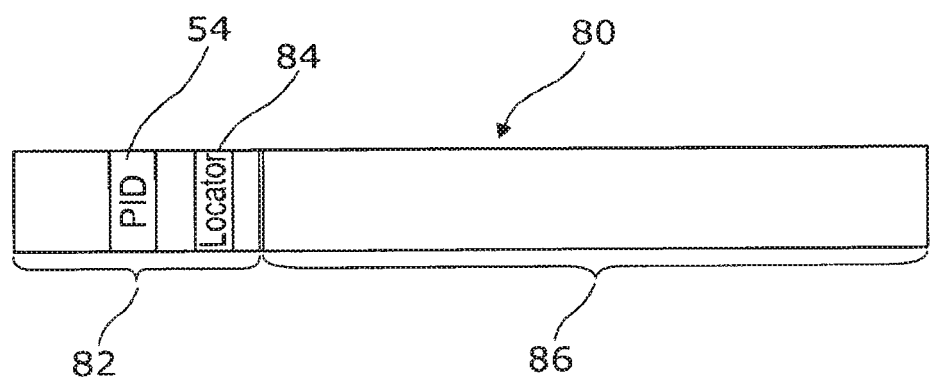
FIG. 4 illustrates aspects of a transport stream packet used in the system of FIG. 2.

The watermarked elementary streams 32 are passed to the content protection and content packaging system 14 for processing as already described above in connection with FIG. 1, although it will be noted that the content protection and content packaging system is now required to process more elementary streams than before. Each watermarked elementary stream 32 is processed by the content protection and content packaging system generating or providing a control word, encrypting a content portion of the watermarked elementary stream 32 using the control word, and distributing the encrypted content portion across a plurality of transport stream packets 80. Aspects of a transport stream packet 80 as discussed herein are illustrated in FIG. 4. A header portion 82 contains a variety of data describing the packet, including a stream label 54 shown here as "PID", and a locator field 84 as described below. A payload portion 86 contains encrypted content from the elementary stream 12.

Returning to FIG. 3, as part of conventional functionality for a legacy content protection and content packaging system 14, the subsystem includes in the header of each transport stream packet 80 a clear text (that is, not encrypted) stream label 54 indicating from which watermarked elementary stream 32 the payload of the transport stream packet 80 is derived. These stream labels 54 are shown in FIG. 3 for the two watermarked elementary streams as $P_1$ and $P_2$. $P_1$ and $P_2$ may be, for example, MPEG PIDs, such that for three original elementary streams, duplicated and watermarked by the pre-processing function 30, the resulting transport stream packets 80 will be identified by six different stream labels 54. These stream labels are also communicated from the content protection and content packaging system 14 to the control system 38. Other relevant stream parameters may also be passed from the content protection and content packaging system 14 to the control system 38. This communication may be such that, for example, the control system 38 obtains the stream label information from a network management system, or via manual configuration uploads by an operator. It is not necessary for the content protection and content packaging system 14 to be adapted to provide this communication function.

The content protection and content packaging system 14 also includes in at least some of the transport stream packets 80 a clear text locator field 84 which supports locating the start of a content portion. In a system according to MPEG-2 standards, this locator field may be the MPEG-2 payload unit start indicator in the transport stream packet header 82 that signals the start of a PES packet in the encrypted payload 86 of a TS packet 80 (this indicator may also be set for unencrypted PES packet payload data).

As already mentioned above, the content protection and content packaging system 14 also embeds, into the transport stream, metadata which can be used by receivers to derive the correct control word to decrypt each content portion, for example as ECMs, with each of a plurality of receivers being enabled to successfully decrypt a different combination of the content portion copies carrying a different combination of watermark symbols and therefore a different fingerprint. In FIG. 3 this functionality is touched on by showing a CA control link 56 exerted on the content protection and content packaging system 14 by the control system 38. Such a link may typically be implemented by a human operator because the legacy content protection and content packaging system and the control system may have no way to establish a communication protocol. The legacy head-end system may already be provided with a network management system that uses a protocol such as SNMP (Simple Network Management Protocol) to configure and monitor the operation of the various subsystems in the head-end. The network management system could, for example, be used to facilitate the easy configuration of the control system 38.

The transport stream packets relating to each different watermarked elementary stream 32 are multiplexed together by the content protection and content packaging system 14 to form an original transport stream 16. However, content from only one elementary stream 12 is now found in transport stream packets with two or more different stream labels 54 because of the action of the copy function 50 and the way in which related watermarked elementary streams 32 are treated separately by the content protection and content packaging system 14. Moreover, because the content protection and content packaging system will generally interleave, into the transport stream, transport stream packets derived from different elementary streams, including interleaving transport stream packets containing data from the different watermarked elementary streams, transport stream packets containing payload data from one of the watermarked elementary streams 32, and encrypted with one control word, will be interleaved with transport stream packets containing payload data from another of the watermarked elementary streams 32, and encrypted with a different control word. This interleaving would make processing of the data at legacy receivers impossible.

The post processing function 34 therefore receives the original transport stream 16 from the content protection and content packaging system 14, and reconfigures and reorders the transport stream packets to form a re-multiplexed transport stream 36 which is passed to the transmission function 18, using information received from the control system 38, in a particular the stream labels 54 of the two or more watermarked elementary streams. The main functional elements required to carry out this processing are shown in FIG. 3. Within the post processing function 34 a stream label filter 58 uses the stream labels 54 contained within the transport stream packets to identify from which watermarked elementary stream 32 each transport stream packet contains payload data, and locator functions 60 use the locator fields 84 to identify which transport stream packets, for each watermarked elementary stream, contain the start of a new content portion. A metadata update function 62 arranges update of other metadata in the transport stream. The locator functions 60 and metadata update function 62 are then used to control reconfiguring and re-multiplexing of the transport stream by the re-multiplex function 64. In particular, all of the transport stream packets 80 that contain an entire content portion from one of the watermarked elementary streams 32 are grouped together in the re-multiplexed transport stream 36, so that transport stream packets 80 deriving from the same content portion but different watermarked elementary streams 32 are not interleaved. Equivalently, transport stream packets for a single content portion but encrypted with different control words should not be interleaved. Transport stream packets for a single content portion and encrypted with the same control word may be contiguous in the stream, although packets carrying data from other elementary streams, or stream metadata may be interleaved therebetween.

The post processing function 34 also re-labels the transport stream packets which derive from the same elementary stream 12 but two or more different watermarked elementary streams 32 so that they carry the same stream label 58. This also helps to avoid the requirement for special handling of the transport stream at the receivers 22, which would conventionally expect all content for a particular elementary stream 12 to arrive within transport stream packets containing the same stream label 58. The metadata update function 62 ensures that metadata in the re-multiplexed transport stream 36 is consistent with this change.

In the case of a DVB standards compliant system, the stream label filter 58 may be described as a PID filter, selecting transport stream packets on the basis of the PID value found in the clear text header. The locator functions 60 detect the start of PES packet data, and the metadata update function 62 maintains consistency of the Program Map Table (PMT) and other metadata tables in the transport stream, for example by consolidating the PMT entries for the two watermarked elementary streams 32 to indicate a single elementary stream consistent with transport stream packets from both watermarked elementary streams 32 carrying the same PID. To fulfil the above condition that transport stream packets 80 deriving from the same content portion but different watermarked elementary streams 32 are not interleaved, transport stream packets 80 under a DVB compliant system are grouped by the re-multiplexer 64 at the PES level. The watermark post processor function 34 also makes sure that clock information in the broadcast stream is suitably adjusted.

Figure 5:
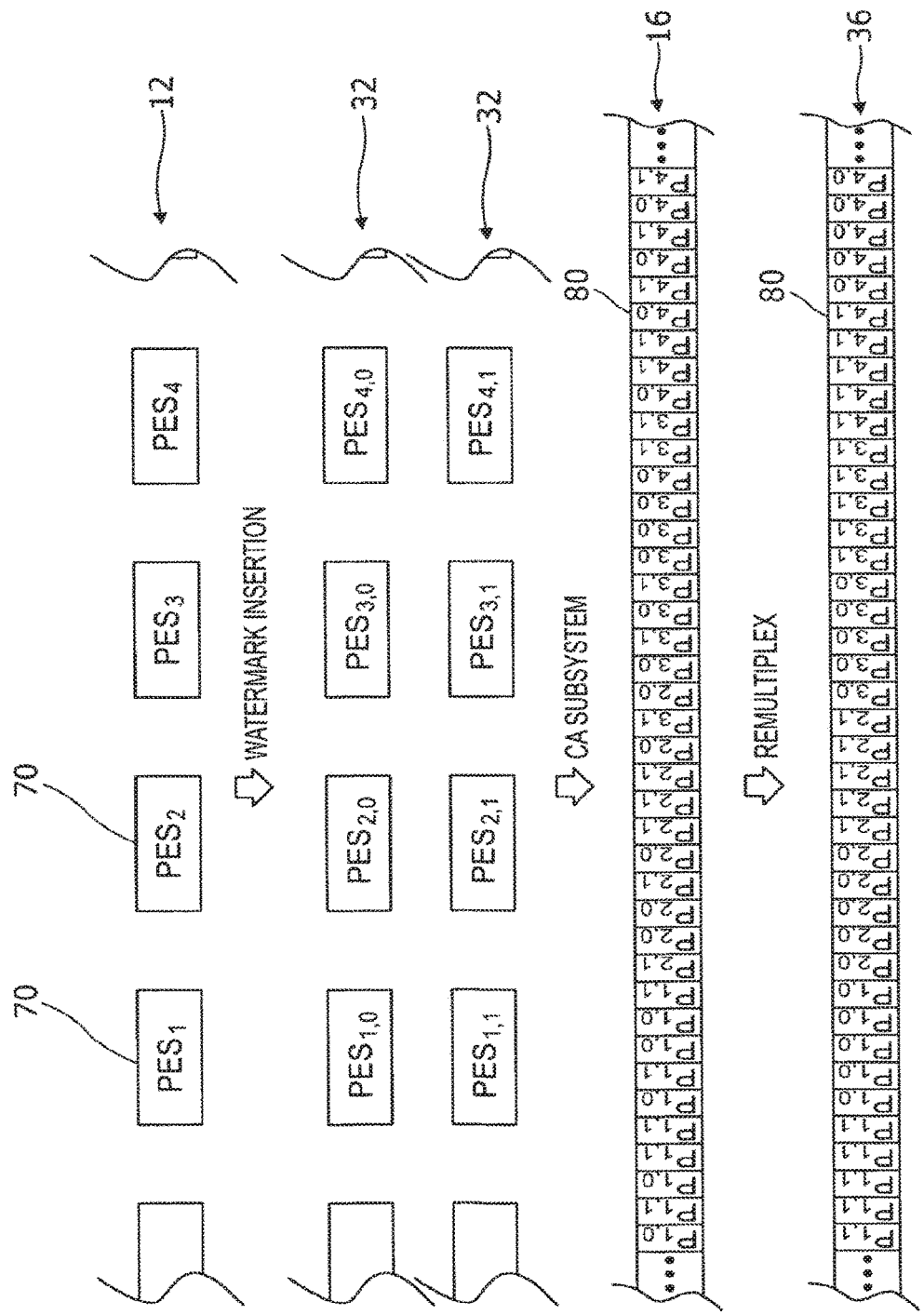
FIG. 5 shows how content is processed in the head-end of FIGS. 2 and 3 to form a re-multiplexed transport stream for delivery to the receivers.

FIG. 5 shows how a series of content portions, represented as DVB PES packets 70 labelled as $PES_1$ to $PES_4$, and representing part of a single elementary stream 12, may be processed by a head-end system of FIGS. 2 and 3 to form a broadcast re-multiplexed transmission stream 36. The pre-processing function forms two watermarked copies of each PES packet 70, each copy being watermarked with a different one of the two watermark symbols, represented by the second index, thus $PES_{1,0}$ and $PES_{1,1}$ etc, the two copies thereby forming the two watermarked elementary streams 32. The two differently watermarked copies of each of the four illustrated PES packets 70, which are therefore contained in the watermarked elementary streams 32, provide 16 possible combinations of the two watermark symbols at a receiver, depending upon which of the two copies of each of the PES packets is successfully decrypted by the receiver. The content protection and content packaging system 34 encrypts the content contained within the watermarked elementary streams 32, and distributes each content portion from each watermarked elementary stream 32 across a number of transport stream packets 80. In FIG. 5 each encrypted content portion is conveniently shown as distributed across only five transport stream packets 80, although in practice several hundred transport stream packets may be used to carry a single content portion, for example if a transport stream packet is 188 bytes in length as is usual in MPEG-2 compliant systems, and each PES packet contains a whole frame of video data. The unit of content data encompassed in or contained by a single PES packet is sometimes referred to as an access unit, and in known systems an access unit may typically correspond to one video frame, or a subset of a frame such as an MPEG slice.

The transport stream packets are multiplexed to form an original transport stream 16 which is passed to the post processing function 34. The stream labels, provided as PIDs in each transport stream packet, are made available to the control system 38. It can be seen that the ordering of the transport stream packets 80, with respect to the watermarked copy from which each is derived, is variable, with transport stream packets from the two differently watermarked copies being interleaved with each other in an arbitrary manner, and transport stream packets derived from different PES packets 70 also being interleaved with each other to some extent.

The original transport stream 16 is passed to the post processing function 34 which carries out reconfiguration and re-multiplexing of the transport stream packets as described above, remerging the transport stream packets into a re-multiplexed transport stream 36 in which transport stream packets are grouped into access units, each access unit containing one watermarked copy of a single PES packet 70. The transport stream packets in the re-multiplexed stream are relabelled with a single stream label or PID value, rather than the two different PID values found in the transport stream packets of the original transmission stream. The re-multiplexing of the transport stream packets into access groups in this way is beneficial for the configuration and operation of the receivers, as will be evident from the following examples.

Figure 6:
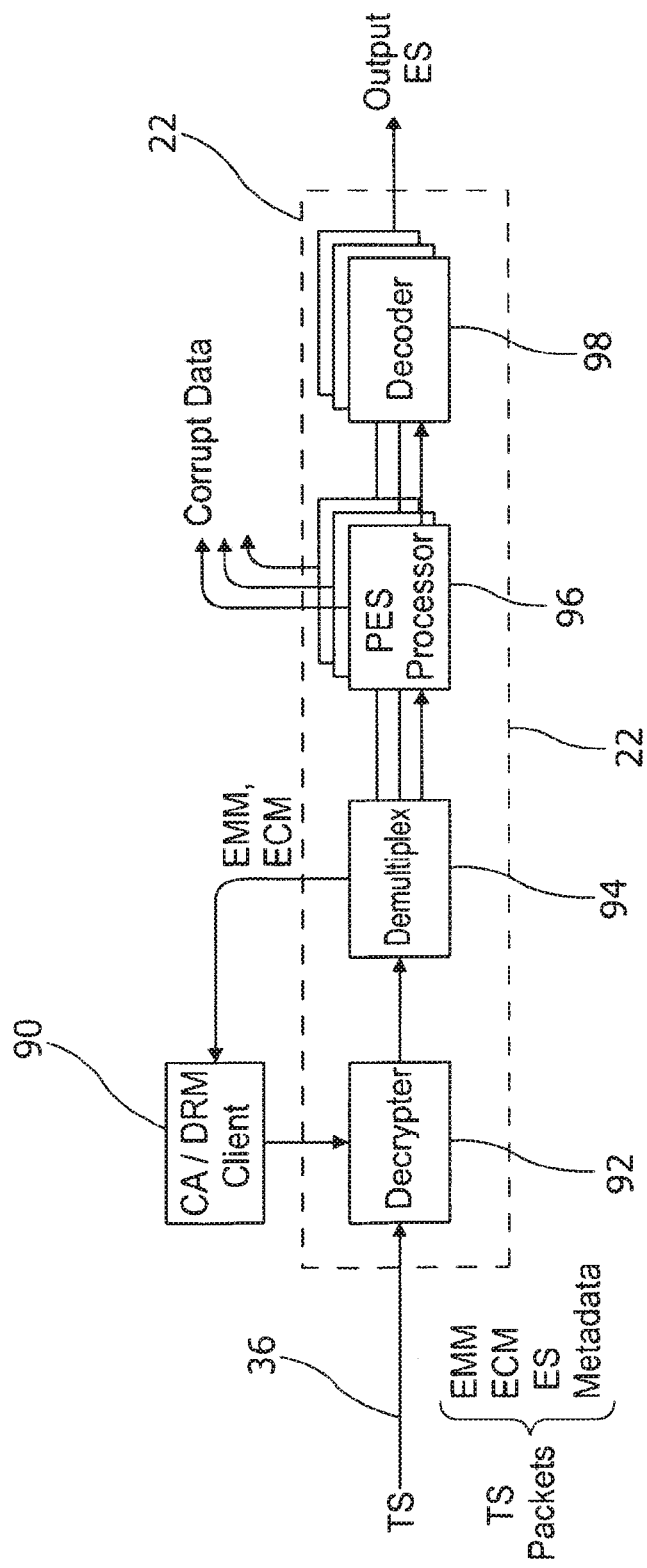
FIG. 6 illustrates aspects of the receivers suitable for processing the re-multiplexed transport stream generated by the head-end of FIGS. 2 and 3.

Some detailed ways in which a transport stream containing multiple watermarked and differently encrypted copies of content portions of an elementary stream may be processed to recover the elementary stream data at a receiver are set out, for example, in EP1134977, EP2334070 and EP2341708, the contents of which are incorporated herein in their entirety. FIG. 6 shows schematically and in outline one way in which this may be achieved.

In FIG. 6, a transport stream 36 is delivered by the network 20 shown in FIG. 2 to receiver 22. Receiver 22 may, for example, be implemented as a set-top box or television set 23 provided with a local CA/DRM client 90, for example in the form of a smartcard. The transport stream 36 contains usual DVB structures, including transport stream packets containing entitlement management messages (EMMs), entitlement control messages (ECMS), elementary stream (ES) data, and other metadata such as a program association table (PAT), at least one program management table (PMT), and at least one conditional access table (CAT).

Following decryption of the transport stream by a decrypter 92, decrypted transport stream packets are passed to a transport stream de-multiplexer 94 in the receiver 22 which removes the transport stream packet structure and controls the flow and use of the decrypted transport stream data in the form of PES packets. The PAT provides data which enables the de-multiplexer 94 to access the correct PMT table for a current program, and to thereby identify and direct EMM packets to the CA/DRM client 90 for decryption to provide one or more session keys, and to direct ECM packets to the CA/DRM client 90 for decryption using the one or more session keys to provide one or mode control words. Using the available metadata, the receiver 22 loads the control words at the correct times into the transport stream decrypter 92. The de-multiplexer 94 directs packets containing elementary stream data to a PES processor 96 which removes the PES packet structures and thereby reconstructs elementary streams from the packetised elementary streams. In FIG. 6 several elementary streams in parallel are shown after the transport stream de-multiplexing operation.

The content protection and content packaging system 14 in the head-end 25 of FIGS. 2 and 3, in conjunction with the control system 38, arranges for the metadata received at the receiver 22 to provide for a particular sequence of control words to be provided by the CA/DRM client to the receiver 22 for loading into the decrypter 92 in respect of each cryptoperiod (interval in which the control word remains unchanged). The control words available to each receiver may be controlled, for example, using entitlement management messages specific to particular groups of receivers. The control words loaded at a particular receiver are arranged so as to enable, during each cryptoperiod, only a selected one of the watermarked copies of each content portion deriving from a PES packet to be successfully decrypted, and the sequence of selection determines the sequence of watermark symbols which are then present in the elementary streams which are passed to the content decoder 98 which reconstructs the content of original elementary streams for output, for example to a separate television or for further processing or display.

As set out in EP2341708, a watermarked copy encrypted with a control word that differs from the control word value loaded into the decrypter 92 leads to an output of decrypted content containing essentially random data as illustrated by the "corrupt data" output of the PES processor 96. In particular, the PES processor 96 may look in the data stream for a PES packet header start pattern (typically a 4 byte value 0x00000001). If this value is not found at the end of an earlier PES packet, the PES processor 96 starts looking for that value in the data stream. This property is used to skip over PES packets that are generated by decrypting transport stream packets using a wrong control word value, as the use of a wrong control word produces essentially random data.

Because the transport stream 36 has been reordered by the post processor 34 to contain transport stream packets which are grouped so that all packets of each content portion for each watermarked elementary stream 32 are together, and not interleaved with transport stream packets deriving from the same original elementary stream but encrypted with a different code word, a sequence of transport stream packets for a particular elementary stream can be processed together by the decrypter 92 without needing to reorder or filter packets according to which watermarked elementary stream 32 they came from. Accordingly, there is no need for the transport stream packets from each of the watermarked elementary streams 32 to carry labels identifying them as such, and all transport stream packets for a particular original elementary stream can carry the same stream identifier 54 or PID. Thus, subject to the correct control words being loaded at the correct times into the decrypter 92, the receiver 22 itself does not need to be especially adapted to handle the transport stream containing the digital fingerprint. Due to the de-interleaving, PES packets decrypted with a wrong control word result in a single batch of random data that ends with the start of a PES packet that is decrypted correctly (i.e. using the correct control word value). This enables the use of legacy receivers as described, for example, in EP2341708. The present invention allows the use of legacy receivers that receive their content from a legacy head-end with only some additional pre-processing and post-processing modules.

Embodiments of the invention described above implement fingerprinting using an adapted head end 25 in which copies of a content portion are differently watermarked and encrypted with different control words. However, the re-multiplexing of transport stream packets as discussed above may also be used for other purposes, for example to more generally permit or deny access to certain content portions by particular receivers 22, using a similar scheme of control words which are selectively available to particular receivers or groups of receivers, and/or by using multiple encryption schemes or algorithms wherein not all receivers are operable to implement all of the schemes or algorithms.

Figure 7:
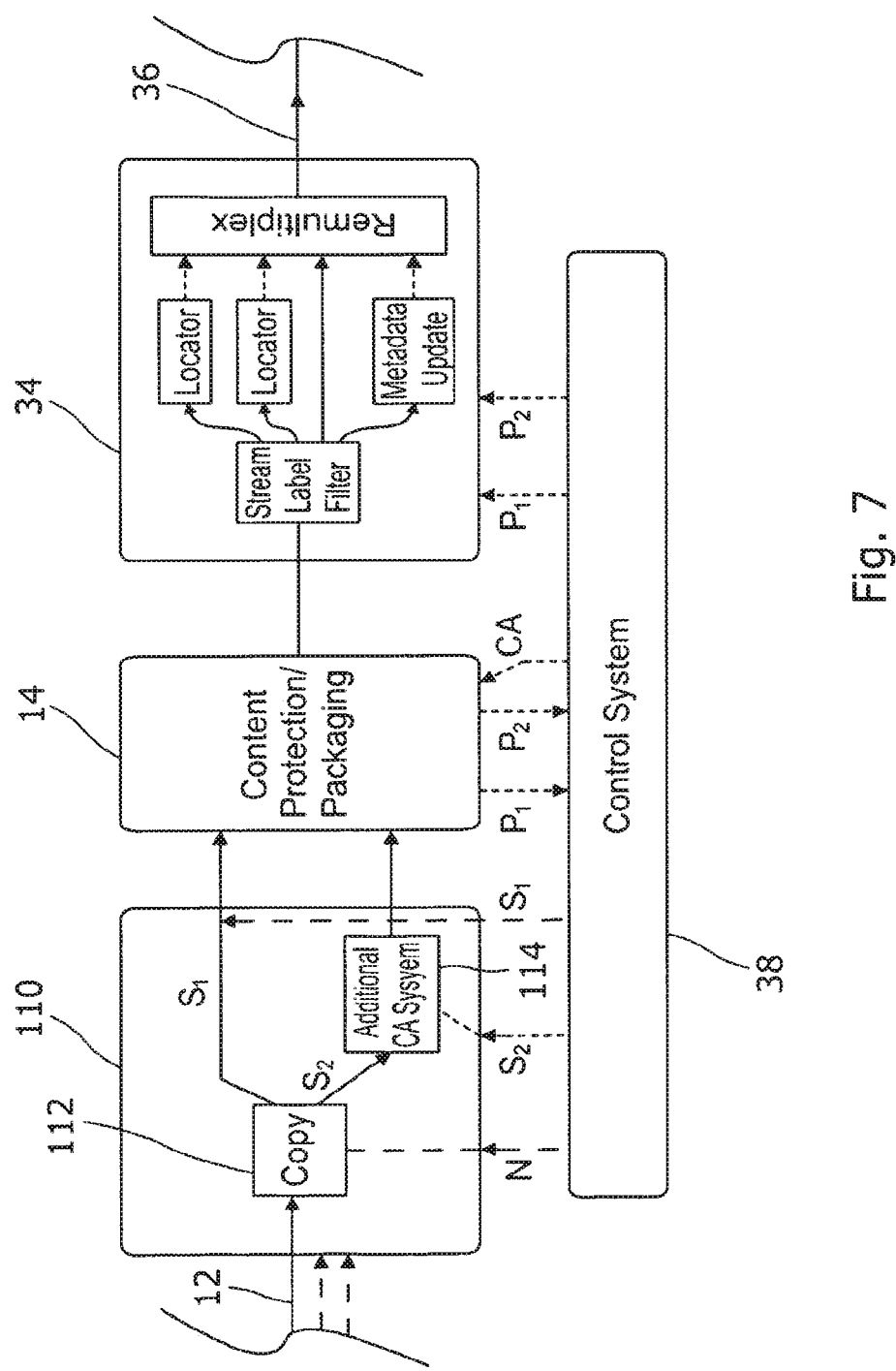
FIG. 7 shows alternative detail of functional modules of the head-end of FIG. 2.

By way of example, FIG. 7 shows an arrangement similar to that of FIG. 3, but in which copies of a content portion are differently encrypted without being watermarked or differently watermarked. The content protection and content packaging system 14 and post processor 34 may be implemented in much the same way as described above, so that the same reference numerals are used. The pre-processor, labelled here as pre-processor 110, is implemented differently, and includes a copy component 112 which passes all content portions into stream $S_1$. Stream $S_1$ is not processed further by the pre-processor 110, but is processed in the content protection and content packaging system 14.

Typically, the content protection and content packaging system 14 in FIG. 7 may encrypt only a fraction, for example about 10%, of stream $S_1$, leaving a common part which is not encrypted. The stream $S_2$ is formed from copies of those content portions which in stream $S_1$ are encrypted by the content protection and content packaging system 14, but for stream $S_2$ these are differently encrypted than the same portions in the $S_1$ stream, by an additional conditional access system 114 shown as part of the pre-processor 110. The output of the additional conditional access system 114 is a transport stream packet stream containing the encrypted version of the $S_2$ elementary stream content portions. This transport stream uses a separate stream label or PID for the contained elementary stream and has additional packets for ECM and EMM data. The output of the additional conditional access system is not further encrypted in the content protection and content packaging system 14, instead passing through the content protection and content packaging system without any significant further processing, perhaps apart from some PID remapping. The post processor 34 serves the same function as described above in connection with FIG. 3, that of combining the $S_1$ and $S_2$ streams into a transport stream 36 such that all of the $S_1$ and $S_2$ content portions are labelled with the same stream label, and are processed by receivers 22 as such.

The arrangement of FIG. 7 may be used to implement DVB schemes in which receivers of the transport stream may use any of two or more encryption modes, for example under the Simulcrypt system. All receivers can use content received in the unencrypted common part of stream $S_1$. Receivers arranged to operate with the conditional access system implemented by the content protection and packaging system 14 are able to use content encrypted by that part of the head end system, and receivers arranged to operate with the additional conditional access system implemented in the pre-processor 110 are able to use content encrypted by that other part of the head-end system.

The arrangement of FIG. 7 can of course be varied to include multiple additional conditional access systems in the pre-processor 110. The transport stream 36 generated by a head-end implementing the arrangement of FIG. 7 may contain a high proportion of unencrypted content portions, for example greater than 90%, or as little as no unencrypted content portions. The scheme can be implemented without using a stream illustrated as $S_1$ in FIG. 7, with multiple copies instead being processed by multiple corresponding conditional access system functions implemented by the pre-processor. Such arrangements can be combined if desired with watermarking and fingerprinting functionality as discussed above.

Figure 8A:
Figure 8A:
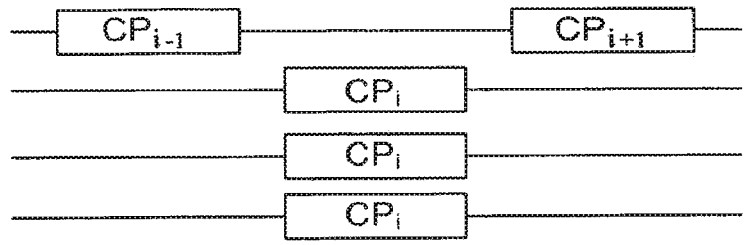
Figure 8A:
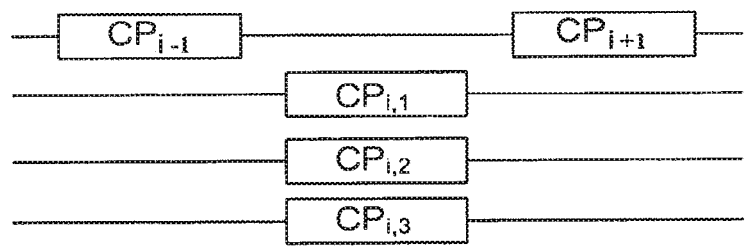
Figure 8A:
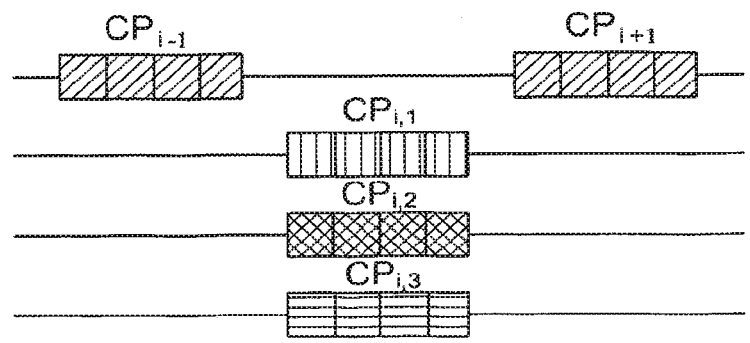

FIGS. 8a and 8b illustrate more generally the pre-processor and post processor functions provided by the invention in order to adapt a legacy head-end to provide re-multiplexed transport stream packets for processing by receivers. In step 1 of these figures, content portions are identified in the original elementary stream. In step 2 a content portion is selected, for example by the pre-processor 30 or 110 of FIG. 3 or 7, and copies are created in separate elementary streams. These copies may then be processed differently in step 3, for example by applying different watermark symbols to the different copies, or otherwise, before the elementary streams containing the various copies are packetised and protected by encryption in step 4. In FIG. 3 this step is carried out in the content protection and content packaging system for all different copies, whereas in FIG. 7 some of the copies are protected by encryption in the pre-processor 110. In step 5 the packets are multiplexed into a single data stream, typically by the content protection and content packaging system 14 shown in the earlier figures. Note that at this stage, content portions from the two or more copies are contained in packets which are interleaved with each other within the data stream.

Steps 6 to 9 of FIGS. 8a and 8b are carried out by the post processor discussed above. The separate elementary streams are first de-multiplexed in step 6 and the packets are then reordered in step 7 to remove the above mentioned interleaving from different copies. The stream labels or PIDs are remapped in step 8 to form a single merged elementary stream in step 8. Finally, in step 9 the packets are re-multiplexed into a single re-ordered data stream with suitably adapted metadata.

Schemes for fingerprinting and otherwise delivering multiple copies of content portions along the lines set out above may require that two (or more) streams of entitlement control, for example as streams of ECMs are delivered to the receiver in the transport stream 36 and that both streams are associated by the receiver with the same elementary stream. This functionality is not generally available in existing receivers 22. Prior art MPEG-2 based conditional access systems associate no more than one ECM stream with each elementary stream, with program mapping tables containing only one conditional access descriptor for each elementary stream. However, it would be desirable to be able to implement such schemes without modifying or providing special functionality in the receivers to handle multiple streams of ECMs.

Figure 9:
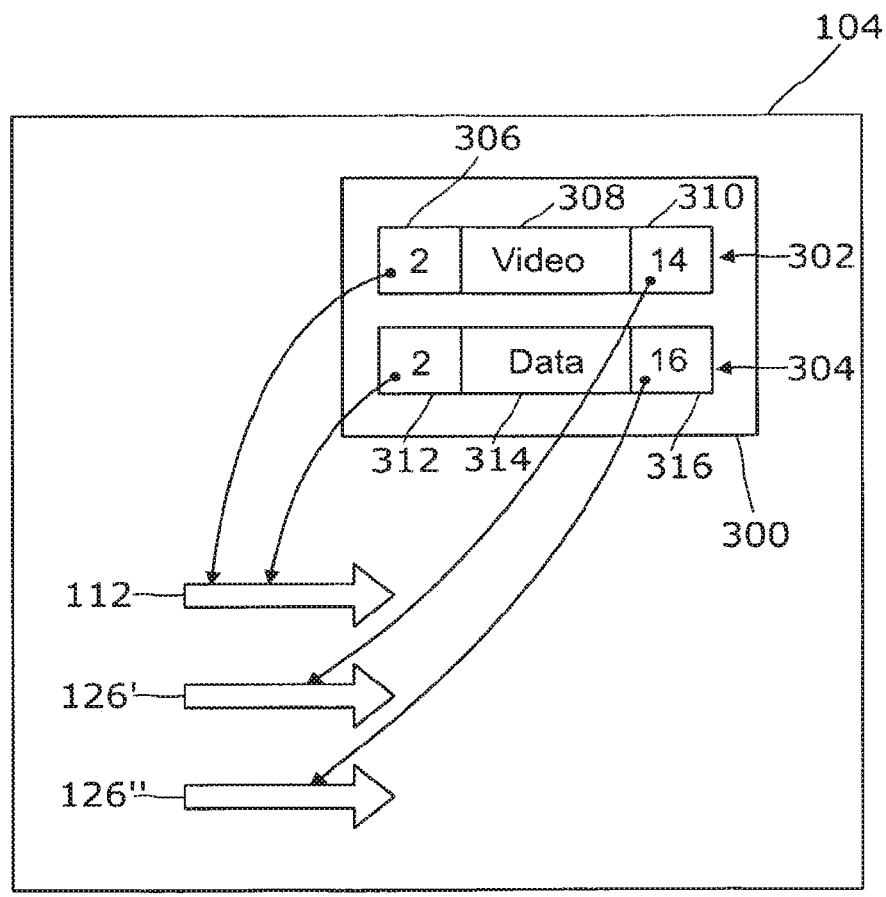
FIGS. 9 and 10 illustrate a structure of part of a transport stream, arranged to associate two streams of entitlement control with a single elementary stream of content.

FIG. 9 illustrates mapping data 300 which may be included in a transport stream 36 in order to associate two ECM streams 126' and 126" with a single elementary or content stream 112, and in particular such a content stream containing encrypted content portions which can be decrypted using code words provided in the two ECM streams. The mapping data 300 includes first mapping data 302 and second mapping data 304. The first mapping data 302 contains a content stream label 306 which enables the receiver 22 to identify transport stream packets containing encrypted content which form part of a particular content stream 112. A first content data type 308 correctly identifies the type of content in the content stream 112, in this case as video data, so that the content stream can be correctly routed and handled in the receiver 108, for example by the appropriate decoders after decryption. A first conditional access stream label 310 enables the receiver 22 to associate the first ECM stream 126' with the content stream 112, and therefore load control words derived from that ECM stream in the CA/DRM client 90 of the receiver into the decrypter to decrypt content from the content stream 112.

The second mapping data 304 contains a content stream label 312 which enables the receiver 22 to identify transport stream packets containing encrypted content which form part of the same content stream 112 as that identified by the first mapping data. A second conditional access stream label 316 then enables the receiver 22 to also associate the second ECM stream 126" with the content stream 112, and therefore load control words derived from that ECM stream in a CA/DRM client 90 into the decrypter 92 to decrypt content from the content stream. However, if the second mapping data 304 also correctly identified the data type of the content in the content stream 112, for example as video data, then this would trigger a selection process in at least some known receivers, typically requiring the user to select one or other of the streams which appear to be provided in the mapping data. Alternatively or additionally, this measure could cause prior art receivers to simply ignore either the first or second of the mapping data groups so that only one ECM stream was recognised and used for providing control words to the decrypter. To avoid such consequences, the second mapping data contains a second content data type 314 which does not correctly identify the type of content in the content stream. Preferably also, this second content data type is a data type which will not trigger any selection function in receivers, for example a non-video and non-audio type. Preferably, the second content data type is a data type for which there is no associated decoding capability in the receiver 108 In particular. Typically, DVB receivers are provided with specialist decoding functions for audio and video data, but not for other data types such as teletext, electronic program guide or general data types.

Figure 10:
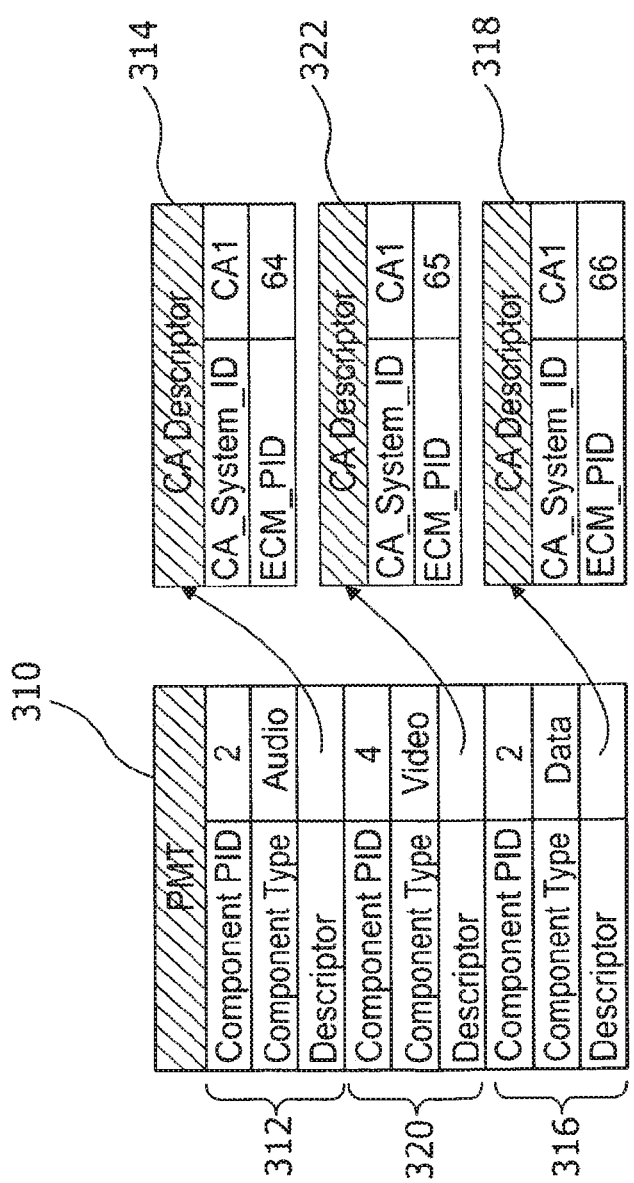

FIG. 10 shows how the first and second mapping data of FIG. 9 may be implemented in an MPEG-2 type conditional access system. The first and second mapping data 302, 304 are implemented together in a program mapping table (PMT) as discussed above. The first entry 312 in the PMT describes an audio content stream having a PID of 2, and pointing to a conditional access descriptor 314 specifying a PID 64 for the associated ECM stream. A third entry 316 in the PMT table also describes a content stream having a PID of 2, thereby associating with the same audio content stream as described by the first entry 312. However, the Component Type descriptor is "Data" instead of "Audio", so that the receiver will accept the entry and process the associated conditional access descriptor 318 which specifies a PID 66 for the associated ECM stream. In this way, the receiver 108 will associate both ECM streams 64 and 66 with the audio stream. The PMT table 310 also describes, in the second entry 320, an video content stream which is associated with a single conditional access descriptor 322 linking the video content stream to a single ECM stream with a PID of 65.

The arrangements described above in respect of FIGS. 9 and 10 may be used to provide multiple ECM streams for decrypting content portions from a single encrypted content stream. In particular, the content stream may contain multiple copies of some or all of the content portions. The multiple ECM streams may then provide key data for decrypting all of the copies, but a receiver 22 may be provisioned with product keys to decrypt key data sufficient only to obtain control words which can be used to successfully decrypt a single copy of each content portion. Suitable provisioning of product keys to different receivers or subsets of receivers, for example using EMMs in the transport stream or some other mechanism (which may be separate to the transport stream) can then cause each different receiver or subset of receivers to successfully decrypt a different combination of the copies of said content. Labelling each copy of a particular content portion with a different watermark symbol then leads to each receiver or subset of receivers to generate clear content with a different sequence of watermark symbols or fingerprint. Alternatively or additionally, such a scheme may be used to provide multiple versions of selected content portions in a single content stream, for example to provide multiple differently encrypted copies of a part of the content stream to implement schemes which have the same effect as PID switching in receivers not adapted to support PID switching, and/or to implement Simulcrypt type systems.

In FIGS. 9 and 10 only one extra group of mapping data is used to associate a single extra ECM stream with a particular content stream. However, further groups of mapping data specifying other ECM streams, and preferably defining different data types can be used to associate three or more ECM streams with a single content stream. This could be used, for example, where three or more differently watermarked and differently encrypted copies of each content portion are included in the transport stream, or three differently encrypted versions of a part of a content stream are to be delivered to different groups of receivers to implement a Simulcrypt or similar scheme.

The use of first and second mapping data as shown in FIGS. 9 and 10 therefore can be used to introduce mapping for a component stream for which there is no associated decoding capability in the receiver, such as a general data component stream. As the receiver does process the conditional access descriptor for such components, it allows the creation of an additional ECM stream for a component stream. The conditional access descriptor in the additional (dummy) component stream is associated with a PID value of the actual component stream. The ECM processing in the CA/DRM client 150 either results in loading a control word for the component stream or it will not return a control word, in particular if the required product key is not available. As the receiver 108 is configured such that all of the ECM streams are associated with the same video or audio content stream, the ECM processing results in loading the correct control word into the decrypter.

The functionality described above in connection with FIGS. 9 and 10 can be implemented in a head-end system as shown for example in FIGS. 2 and 7 using an appropriate set-up of the pre-processor 30,110. The pre-processor may be arranged to generate a second stream (which could be labelled "data") so that the content protection and content packaging system would generate separate ECM streams for the two elementary stream inputs as well as the corresponding metadata. After packet re-ordering and PID remapping, the resulting stream then accords with the arrangements shown in FIGS. 9 and 10.

The functionality of the head-end system 25 and receivers as described above may be implemented in hardware, in software or a combination of both. Accordingly, when functionality such as that of the pre-processing module 30 and post processing module 34 is described, this may be provided as computer program elements, which may be stored in a volatile computer memory, a non-volatile computer memory, on hard disks coupled or on removable media such as CDROM or DVD data disks, and may also be transmitted as a data signal over a network or other telecommunications connection.

It will be understood that variations and modifications may be made to the described embodiments without departing from the scope of the invention as defined in the appended claims. For example, it is to be understood that any feature described in relation to any one embodiment may be used alone, or in combination with other features described, and may be used in combination with one or more features of any of the other embodiments, or any combination of the other embodiments.

The invention claimed is:

1. A head-end system for preparing digital content for transmission to a plurality of receivers, the digital content comprising a sequence of content portions, the system comprising:
   a pre-processor arranged to generate at least first and second copies of each content portion;
   a content protection and content packaging system arranged to output each of the at least first and second copies of each content portion into a separate group of transport stream packets, each of the at least first and second copies of each content portion distributed into transport stream packets being differently encrypted to the other or others of the copies of that content portion, and to merge all of the said transport stream packets for each content portion into an original transport stream in which at least some of the transport stream packets deriving from the same content portion but differently encrypted are interleaved; and
   a post-processor arranged to reorder the original transport stream packets to form a re-multiplexed transport stream in which transport stream packets containing parts of the same content portion but being differently encrypted are not interleaved.

2. The head-end system of claim 1 in which the pre-processor is arranged to watermark each of the copies of a said content portion with a different symbol.

3. The head-end system of claim 1 in which the content protection and content packaging system is arranged to differently encrypt each of the copies of a said content portion.

4. The head-end system of claim 1 in which the pre-processor and content protection and packaging system are arranged to differently encrypt different copies of a said content portion.

5. The head-end system of claim 1 wherein differently encrypting comprises encrypting using different control words.

6. The head-end system of claim 1 wherein differently encrypting comprises encrypting using different encryption algorithms.

7. The head-end system of claim 1 wherein the content protection and content packaging system is arranged such that at least some of the transport stream packets of the original transport stream containing parts of different content portions are interleaved, and the post-processor is further arranged to reorder the packets of the original transport stream such that said transport stream packets containing parts of different content portions are not interleaved.

8. The head-end system of claim 1 wherein the content protection and content packaging system marks the transport stream packets containing each of the differently encrypted copies of a said content portion with a different corresponding stream label visible in the transport stream packets to the post-processor.

9. The head-end system of claim 8 wherein the post-processor comprises a stream label filter arranged to detect and filter received transport stream packets according to the stream label applied by the content protection and content packaging system.

10. The head-end system of claim 8 wherein the post-processor replaces the different corresponding stream labels with a single stream label for the transport packets containing any of the differently encrypted copies of a said content portion in the re-multiplexed transport stream.

11. The head-end system of claim 1 arranged to include in the re-multiplexed transport stream data enabling handling of said differently encrypted copies at said receivers such that each one of at least two of said receivers or at least two groups of said receivers reconstructs the sequence of content portions to contain a different combination of said copies.

12. The head-end system of claim 11 wherein the data enabling handling of said differently encrypted copies includes entitlement control messages comprising control words useable to decrypt said copies.

13. The head-end system of claim 1, further adapted to include in the re-multiplexed transport stream:
   a stream comprising said differently encrypted parts of a said content portion;
   a first entitlement control message containing key data for decrypting a first said copy of the content portion;
   a second entitlement control message containing key data for decrypting a second said copy of the content portion;
   first mapping data comprising a content stream label identifying said stream of differently encrypted parts of a said content portion, a first content data type corresponding to a data type of said content portion, and a first conditional access stream label identifying said first entitlement control message; and second mapping data comprising said content stream label identifying said stream of differently encrypted parts of said content portion, a second data type not corresponding to a data type of said content portion, and a second conditional access stream label identifying said second entitlement control message.

14. The head-end system of claim 13 wherein the transport stream contains substantially no content portions of the second content data type identified by said second mapping data.

15. The head-end system of claim 13 wherein the second content data type is a content type for which there is no associated decoding capability in some or all of the receivers.

16. A digital television system comprising:

a head-end system for preparing digital content for transmission to a plurality of receivers, the digital content comprising a sequence of content portions, the head-end system comprising:
  a pre-processor arranged to generate at least first and second copies of each content portion;
  a content protection and content packaging system arranged to output each of the at least first and second copies of each content portion into a separate group of transport stream packets, each of the at least first and second copies of each content portion distributed into transport stream packets being differently encrypted to the other or others of the copies of that content portion, and to merge all of the said transport stream packets for each content portion into an original transport stream in which at least some of the transport stream packets deriving from the same content portion but differently encrypted are interleaved; and
  a post-processor arranged to reorder the original transport stream packets to form a re-multiplexed transport stream in which transport stream packets containing parts of the same content portion but being differently encrypted are not interleaved; and a plurality of receivers coupled to the head-end system by a transmission medium.

17. A method, implemented by one or more processors, of preparing digital content for transmission to a plurality of receivers, the digital content comprising a sequence of content portions, comprising:

generating at least first and second copies of selected ones of said content portions;

distributing each of the at least first and second copies of each selected content portion in encrypted form into a separate group of transport stream packets, each of the at least first and second copies of each selected content portion distributed into transport stream packets being differently encrypted to each other;

merging all of the said transport stream packets for each selected content portion into an original transport stream in which at least some of the transport stream packets deriving from the same content portion but being differently encrypted are interleaved; and reordering the original transport stream packets to form a re-multiplexed transport stream in which transport stream packets containing parts of the same content portion but being differently encrypted are not interleaved.

18. The method of claim 17 further comprising watermarking each of the copies of a selected content portion with a different symbol.

19. The method of claim 17 wherein differently encrypting comprises encrypting using different control words.

20. The method of claim 17 further comprising marking the transport stream packets containing each of the differently encrypted copies of a content portion with a different corresponding stream label visible in the packets of the original transport stream.

21. The method of claim 20 further comprising filtering transport stream packets in the original transport stream according to a stream label, in preparation for the step of reordering.

22. The method of claim 20 further comprising replacing the different corresponding stream labels with a single stream label for the transport packets containing any of the differently encrypted copies, and using said single stream label in the transport packets in the re-multiplexed transport stream.

23. The method of claim 17 further comprising including in the re-multiplexed transport stream data enabling handling of said differently encrypted copies at said receivers such that each one of at least two of said receivers or at least two groups of said receivers is enabled to reconstruct the sequence of content portions to contain a different combination of copies.

24. The method of claim 23 wherein the data enabling handling of said differently encrypted copies includes entitlement control messages comprising control words useable to decrypt said copies.

25. The method of claim 17, further comprising including in the re-multiplexed transport stream:
  a stream comprising said differently encrypted parts of the same content portion;
  a first entitlement control message containing key data for decrypting a first said copy of the content portion;
  a second entitlement control message containing key data for decrypting a second said copy of the content portion;
  first mapping data comprising a content stream label identifying said stream of differently encrypted parts of the same content portion, a first content data type corresponding to a data type of said content, and a first conditional access stream label identifying said first entitlement control message; and
  second mapping data comprising said content stream label identifying said stream of differently encrypted parts of the same content portion, a second data type not corresponding to a data type of said content, and a second conditional access stream label identifying said second entitlement control message.

26. The method of claim 25 wherein the method includes in the transport stream no content portions of the second content data type identified by said content stream label.

27. The method of claim 25 wherein the second content data type is a content type for which there is no associated decoding capability in the receivers.

28. The method of claim 25 wherein the first mapping data and second mapping data are first and second entries in an MPEG program mapping table included in the transport stream.

29. The method of claim 28 wherein the first and second conditional access stream labels are included in conditional access descriptors of the program mapping table.

30. The method of claim 25 wherein said content stream label and said conditional access stream labels are MPEG PIDs.

31. The method of claim 25 wherein the first content data type is a video data type and the second content data type is not a video data type.

32. A method, implemented by one or more processors, of adapting a head-end system for preparing digital content comprising a sequence of content portions for transmission to a plurality of receivers, the head-end system including a content protection and content packaging system arranged to encrypt and distribute said content portions into a plurality of transport stream packets, the method comprising:

adding to the head-end system a pre-processor arranged to generate at least first and second copies of each content portion, and coupling the pre-processor to the content protection and content packaging system such that each of the at least first and second copies of each content portion is distributed into a separate group of transport stream packets in a differently encrypted form, and all of the said transport stream packets for each content portion are merged into an original transport stream; and adding to the head-end system a post-processor arranged to reorder the original transport stream packets to form a re-multiplexed transport stream in which transport stream packets containing parts of the same content portion but being differently encrypted are not interleaved.

33. One or more tangible non-transitory computer readable media comprising computer program code that, when executed by a processor, causes the processor to prepare digital content for transmission to a plurality of receivers, the digital content comprising a sequence of content portions, by:

generating at least first and second copies of selected ones of said content portions;

distributing each of the at least first and second copies of each selected content portion in encrypted form into a separate group of transport stream packets, each of the at least first and second copies of each selected content portion distributed into transport stream packets being differently encrypted to each other;

merging all of the said transport stream packets for each selected content portion into an original transport stream in which at least some of the transport stream packets deriving from the same content portion but being differently encrypted are interleaved; and reordering the original transport stream packets to form a re-multiplexed transport stream in which transport stream packets containing parts of the same content portion but being differently encrypted are not interleaved.

34. One or more tangible non-transitory computer readable media comprising computer program code that, when executed by a processor, causes the processor to modify a head-end system, the head-end system being configured to prepare digital content comprising a sequence of content portions for transmission to a plurality of receivers, the head-end system including a content protection and content packaging system arranged to encrypt and distribute said content portions into a plurality of transport stream packets, by:

adding to the head-end system a pre-processor arranged to generate at least first and second copies of each content portion, and coupling the pre-processor to the content protection and content packaging system such that each of the at least first and second copies of each content portion is distributed into a separate group of transport stream packets in a differently encrypted form, and all of the said transport stream packets for each content portion are merged into an original transport stream; and adding to the head-end system a post-processor arranged to reorder the original transport stream packets to form a re-multiplexed transport stream in which transport stream packets containing parts of the same content portion but being differently encrypted are not interleaved.

* * * * *